US012588581B2

(12) United States Patent
Collin

(10) Patent No.: US 12,588,581 B2
(45) Date of Patent: Mar. 31, 2026

(54) FURROW OPENER, ROW UNIT AND AGRICULTURAL IMPLEMENT, AND METHOD OF MANUFACTURING AND ASSEMBLY THEREOF

(71) Applicant: Väderstad Holding AB, Väderstad (SE)

(72) Inventor: Morgan Collin, Mjölby (SE)

(73) Assignee: Väderstad Holding AB, Väderstad (SE)

( * ) Notice: Subject to any disclaimer, the term of this patent is extended or adjusted under 35 U.S.C. 154(b) by 998 days.

(21) Appl. No.: 17/763,324

(22) PCT Filed: Sep. 22, 2020

(86) PCT No.: PCT/SE2020/050886
§ 371 (c)(1),
(2) Date: Mar. 24, 2022

(87) PCT Pub. No.: WO2021/061039
PCT Pub. Date: Apr. 1, 2021

(65) Prior Publication Data
US 2022/0369537 A1 Nov. 24, 2022

(30) Foreign Application Priority Data
Sep. 25, 2019 (SE) .................................... 1951083-3

(51) Int. Cl.
A01C 5/06 (2006.01)
A01C 7/20 (2006.01)
(52) U.S. Cl.
CPC .............. A01C 5/064 (2013.01); A01C 7/201 (2013.01)

(58) Field of Classification Search
CPC .......... A01C 5/064; A01C 7/201; A01B 71/04
See application file for complete search history.

(56) References Cited

U.S. PATENT DOCUMENTS

| | | | | |
|---|---|---|---|---|
| 670,743 A * | 3/1901 | Swebilius | .............. | A01B 15/08 |
| | | | | 172/167 |
| 988,386 A * | 4/1911 | Rasmussen | ............ | A01B 39/14 |
| | | | | 172/156 |
| 1,095,798 A | 5/1914 | Brennan, Jr. | | |
| 1,207,166 A * | 12/1916 | Heylman | ............. | A01B 17/002 |
| | | | | 172/166 |

(Continued)

FOREIGN PATENT DOCUMENTS

| | | |
|---|---|---|
| CN | 206302721 U | 7/2017 |
| CN | 206547292 U | 10/2017 |

(Continued)

*Primary Examiner* — Alicia Torres
(74) *Attorney, Agent, or Firm* — COATS & BENNETT, PLLC

(57) ABSTRACT

A seed furrow opener comprises a seed furrow opener arm, and a pair of seed discs rotatively connected to the seed furrow opener arm via at least one shaft. Geometrical rotational axes of the respective seed discs are non-parallel to each other, making a mutual distance between the peripheries of the seed discs non-constant. The seed furrow opener arm has a continuous cut-out for mounting the shaft, a slot extending from the cut-out to the periphery of the seed furrow opener arm, and a clamping device arranged to compress the slot and clamp the shaft.

18 Claims, 5 Drawing Sheets

(56)                    References Cited

U.S. PATENT DOCUMENTS

| | | | | |
|---|---|---|---|---|
| 1,391,593 | A | * | 9/1921 | Sweeting ............... A01B 15/16 |
| | | | | 172/559 |
| 2,091,486 | A | | 8/1937 | Paluck |
| 2,685,243 | A | | 8/1954 | Cole |
| 2,728,179 | A | * | 12/1955 | Youngberg .......... A01B 23/046 |
| | | | | 172/581 |
| 3,499,495 | A | | 3/1970 | Pust |
| 3,507,233 | A | | 4/1970 | Greig |
| 4,009,668 | A | | 3/1977 | Brass et al. |
| 4,034,688 | A | | 7/1977 | Ernst |
| 4,090,456 | A | | 5/1978 | Morrison, Jr. et al. |
| 4,116,140 | A | | 9/1978 | Anderson et al. |
| 4,275,670 | A | | 6/1981 | Dreyer |
| 4,294,180 | A | | 10/1981 | Pust |
| 4,404,918 | A | | 9/1983 | Whalen et al. |
| 4,598,654 | A | | 7/1986 | Robertson et al. |
| 4,779,684 | A | | 10/1988 | Schultz |
| 4,793,511 | A | | 12/1988 | Ankum et al. |
| 5,074,227 | A | | 12/1991 | Schwitters |
| 5,443,023 | A | | 8/1995 | Carroll |
| 6,578,502 | B1 | | 6/2003 | Barnstable et al. |
| 6,896,438 | B1 | | 5/2005 | Chen |
| 7,562,631 | B2 | * | 7/2009 | Cey ........................ A01C 5/064 |
| | | | | 111/167 |
| 8,960,322 | B2 | | 2/2015 | Kester |
| 2003/0111002 | A1 | | 6/2003 | Jones |
| 2009/0071383 | A1 | | 3/2009 | Cey |
| 2010/0282480 | A1 | | 11/2010 | Breker et al. |
| 2011/0283927 | A1 | | 11/2011 | Shoup |
| 2012/0012042 | A1 | | 1/2012 | Castagno Manasseri et al. |
| 2012/0060730 | A1 | | 3/2012 | Bassett |
| 2014/0090585 | A1 | | 4/2014 | Sauder et al. |
| 2015/0216104 | A1 | | 8/2015 | Bassett |
| 2016/0192572 | A1 | | 7/2016 | Gebbeken et al. |
| 2019/0249818 | A1 | | 8/2019 | Sheppard et al. |
| 2020/0178457 | A1 | * | 6/2020 | Sivinski ................. A01C 5/064 |
| 2025/0241233 | A1 | * | 7/2025 | Gentili ................... A01C 7/006 |

FOREIGN PATENT DOCUMENTS

| | | | |
|---|---|---|---|
| DE | 4138633 | A1 | 5/1993 |
| EP | 2005811 | A2 | 12/2008 |
| EP | 2422599 | A1 | 2/2012 |
| EP | 2965606 | A1 | 1/2016 |
| FR | 2415420 | A1 | 8/1979 |
| FR | 2452027 | A1 | 10/1980 |
| FR | 2512629 | A2 | 3/1983 |
| GB | 773399 | | 4/1957 |
| JP | 4117064 | B2 | 7/2008 |
| RU | 97894 | U1 | 9/2010 |
| SU | 927158 | A2 | 5/1982 |
| WO | 8505246 | A1 | 12/1985 |
| WO | 0170007 | A1 | 9/2001 |
| WO | 2006110103 | A1 | 10/2006 |
| WO | 2010138068 | A1 | 12/2010 |
| WO | 2011119095 | A1 | 9/2011 |
| WO | 2015071652 | A1 | 5/2015 |

* cited by examiner

21

20

2

23

22

25

24

26

21

20

2

23

22

24

FURROW OPENER, ROW UNIT AND AGRICULTURAL IMPLEMENT, AND METHOD OF MANUFACTURING AND ASSEMBLY THEREOF

TECHNICAL FIELD

The present document relates to a seed furrow opener, a row unit comprising such a seed furrow opener and an agricultural implement comprising a plurality of such row units.

The present document further relates to a method for manufacturing a seed furrow opener arm and for mounting a seed furrow opener.

BACKGROUND

Seed furrow openers comprising a seed furrow opener arm and a pair of seed discs, on which the axes of rotation are non-parallel to each other, are known from, for example, U.S. Pat. No. 4,009,668 and EP2965606A1. The seed discs are mounted relative to the seed furrow opener arm by means of a shaft unit, which may comprise a fastening portion and a pair of non-parallel shaft portions, on which the seed discs are mounted, for example by means of roller bearings.

At the construction of such seed furrow openers, it is desirable to be able to place the seed discs at a relatively small angle relative to each other so that a narrow furrow is formed. Thus, it is desirable to provide a very compact shaft unit.

Furthermore, it is desirable to provide a seed furrow opener in which the axial position of the seed discs is adjustable, so that the discs can be adjusted against each other as their peripheral edge portions are worn, due to the use of the seed discs.

In addition, it is desirable to be able to easily mount and disassemble the shaft unit, especially in field conditions, for example to replace worn or broken seed discs, or to be able to adjust the orientation of the seed discs, so that an optimal geometry is achieved for an intended working depth.

Thus, there is a need for an improved seed furrow opener, and especially a seed furrow opener, which can better meet the above requirements.

SUMMARY

An object of the present document is thus to provide an improved seed furrow opener, and in particular a seed furrow opener which to a greater extent than previously, in whole or in part, fulfils at least some of the above requirements.

The invention is defined by the appended independent claims. Embodiments appear from the dependent claims, from the following description and from the accompanying drawings.

According to a first aspect, a seed furrow opener is provided, comprising a seed furrow opener arm, and a pair of seed discs rotatably connected to the seed furrow opener arm via at least one shaft unit, each of the seed discs having a respective geometric axis of rotation, and the rotation axes being non-parallel, so that a mutual distance between the peripheries of the seed discs is non-constant. The seed furrow opener has a continuous cut-out formed in the seed furrow opener arm, for mounting the shaft unit, a slot extending from the cut-out to a periphery of the seed furrow opener arm, and a clamping device arranged for compressing the slot, so that the shaft unit is clamped in the cut-out.

By the slot extending "to a periphery" is meant that the slot also cuts the periphery.

The compression is performed in a direction parallel to the main plane of the seed furrow opener arm.

By clamping the cut-out with the aid of a clamping device which compresses the slot, a space-efficient fastening of the shaft unit is achieved.

Furthermore, the clamping device enables replacement of the shaft unit even under field conditions.

In addition, such a seed furrow opener is possible to manufacture at low cost.

The seed furrow opener arm may be formed of a flat blank of substantially constant thickness, the blank having a pair of opposite and mutually parallel main surfaces and an edge surface extending therebetween.

The blank may be a sheet metal with a thickness of about 5-40 mm, preferably about 10-30 mm.

The clamping device may comprise at least one bolt, which acts in direction parallel to said main surfaces of the flat blank.

The bolt may be received in a cut-out in the edge surface, which cut-out is at a distance from the main surfaces.

The cut-out can be formed in the form of a hole which extends across the slot and which may have an inner thread.

The seed furrow opener may further comprise a limiting member, for limiting a clamping force provided by the clamping device.

The limiting member can be arranged at least partially in the slot.

The shaft unit may comprise a fastening portion and a pair of shaft portions, which extend from respective opposite sides of the fastening portion and non-parallel to each other.

At least one of the cut-out and the shaft unit may comprise a locking arrangement for counteracting relative rotational movement between the cut-out and the shaft unit.

The locking device may comprise at least one keyway formed in the cut-out and/or in the shaft unit.

The locking device can be designed to lock the shaft unit relative to the cut-out in at least two different mutual rotational positions.

The locking device may comprise at least two keyways formed in the cut-out and/or in the shaft unit, which are separated by a center angle of at least 20 degrees, and which are arranged so that said at least two mutual rotational positions differ by less than 20 degrees.

According to a second aspect, a row unit comprising a seed furrow opener as described above.

The row unit may comprise a row unit frame and the seed furrow opener arm may be movably connected to the row unit frame.

The row unit may comprise a row unit frame and the seed opener arm may be integrated with the row unit frame.

According to a third aspect, an agricultural implement comprising at least two row units as described above is provided.

The agricultural implement may comprise an implement frame and each of the row units may be movably connected to the implement frame.

According to a fourth aspect, there is provided a method of manufacturing a seed furrow opener arm, comprising cutting to a periphery of the seed furrow opener arm from a flat sheet-shaped blank having a pair of opposed and mutually parallel major surfaces and an extending edge surface therebetween that, at a distance from the seed furrow opener, forming at least one continuous cut-out in the blank, and subsequently forming a slot connecting the periphery to the cut-out.

In the method, the formation of at least one continuous cut-out may comprise forming a first cut-out, which is adapted in shape and size to receive a shaft unit, and, between the first cut-out and the periphery, forming a second cut-out, forming the slot comprising connecting the first and second cut-outs with each other by means of a first slot portion and connecting the second cut-out to the periphery by means of a second slot portion.

At least one of the first and second cut-outs can be processed into a final shape by mechanical cutting machining.

At least one of the slot portions can be formed by mechanical cutting machining.

The method may further comprise forming at least one cut-out extending from the edge surface, parallel to the main surfaces across the slot, wherein the cut-out being formed before the slot.

The periphery can be formed by punching or laser cutting.

According to a fifth aspect, there is provided a method of mounting a seed furrow opener, comprising providing a seed furrow opener arm, comprising a through cut out, formed in the seed furrow opener arm, for mounting the shaft unit, a slot extending from the cut-out to a periphery of the seed furrow opener arm, and a clamping device, arranged for compressing the slot. The method comprises providing a shaft unit, comprising a fastening portion and a pair of shaft portions extending from respective opposite sides of the fastening portion and non-parallel to each other, arranging the fastening portion of the shaft unit in the cut-out, and actuating the clamping device so that the slot is compressed, and the shaft unit is clamped in the cut-out.

The method may further comprise providing a limiting member, as well as arranging it in the slot to limit the compression of the slot.

DETAILED DESCRIPTION

In the following, the description will be focused on a row unit of a precision seed drill, which constitutes an application for the present seed furrow opener.

The seed furrow opener can, however, be used in other types of seed drills, including seed drills which work with volumetric feeding, as well as in other forms of agricultural implements which feed granular material to land over which the agricultural implement travels.

Figure 1:
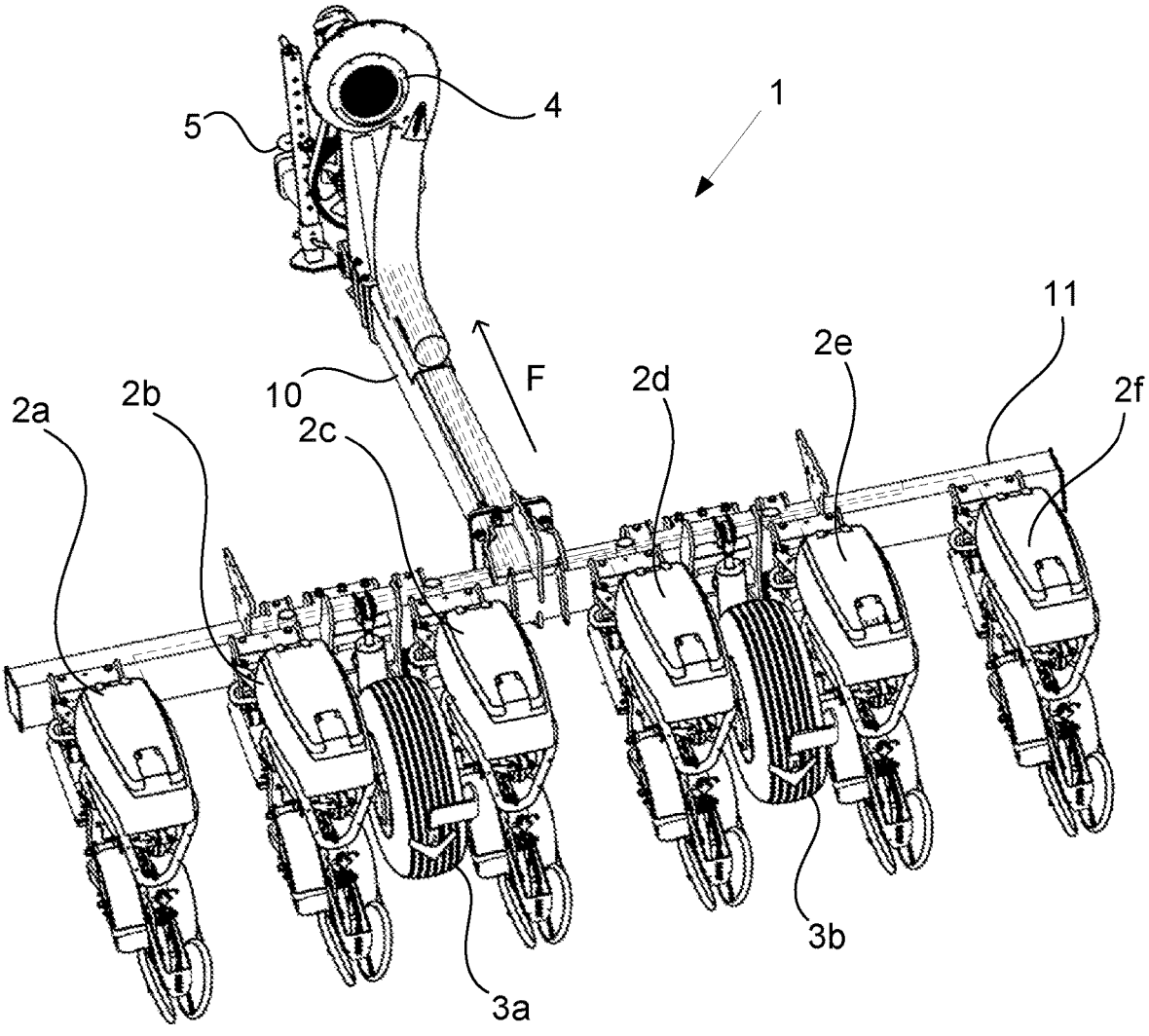
FIG. 1 shows a perspective view of an agricultural implement comprising a plurality of row units.

Referring to FIG. 1, an agricultural implement 1 comprises a frame 10, 11, which may comprise one or more longitudinal beams 10 and one or more transverse beams 11.

The agricultural implement has a number of row units 2a-2f, which are illustrated here as row units of a precision seed drill.

The row units 2a-2f can be fixedly or movably mounted at the frame 10, 11 of the agricultural implement 1. In the example shown, the row units 2a-2f are mounted at one and the same transverse beam 11.

The agricultural implement may have a plurality of row unit-bearing beams, which may be movable relative to each other, for example to be able to be folded from a working position to a transport position and/or to be able to be adjusted to compensate for irregularities in the ground over which the agricultural implement travels.

The agricultural implement can have a number of wheels 3a, 3b, which can be used when driving in the field, for example for controlling the ground pressure of the row units, and/or when during transport by road.

The agricultural implement 1 may comprise one or more fans 4 for generating an air stream, by means of which material can be transported from a central container directly to the seed tubes of the row units, from a central container to containers of each row unit and/or from containers of each row unit to seed tubes at the respective row unit.

Furthermore, the agricultural implement 1 may have a coupling device 5 for coupling to a towing vehicle, such as a tractor. The coupling device 5 can be a traction coupling device, in the case where the agricultural implement 1 is intended to be towed after the towing vehicle, or an implement holder, in the case where the agricultural implement 1 is intended to be supported by a tractor's implement coupling.

Figures 2, 3:
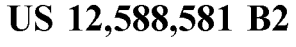
FIG. 2 shows a part of a row unit.
FIG. 3 shows a row unit frame.

FIGS. 2-3 schematically show a row unit 2 with a plurality of parts, such as material containers, support wheels, seed closures and sowing device, removed.

The row unit 2 has a frame 20, a mounting bracket 21, a seed opening arm 22 and a pressure wheel arm 23.

In the example shown, a part of the mounting bracket 21, the frame, the seed furrow opener arm and the pressure wheel arm 23 are fixedly arranged relative to each other.

The mounting bracket 21 may comprise further parts (not shown), for example to provide a movable attachment relative to the frame 10, 11 through a parallel linkage (not shown).

The seed furrow opener arm 22 may be integrated with, such as formed integrally with, the frame 20. Alternatively, the seed furrow opener arm 22 may be movably mounted relative to the frame 20, for example so that the seed furrow opener arm 22 may be rotatable relative to the frame 20.

In the same way, the pressure wheel arm 23 may be integrated with, such as formed in one piece with, the frame 20. Alternatively, the pressure wheel arm 23 can be movably mounted relative to the frame 20, for example so that the pressure wheel arm 23 can be rotatable relative to the frame 20.

The seed furrow opener arm 22 may be formed of a flat sheet-shaped blank, preferably of metal, such as steel, which blank may have a thickness of the order of 5-30 mm, preferably 8-25 mm or 10-20 mm. The sheet-shaped blank can thus have a pair of mutually parallel main surfaces and an edge surface, which extends between the main surfaces.

The frame 20 and/or the pressure wheel arm 23 may be formed of the same type of material as the seed furrow opener arm 22, possibly of greater or lesser thickness.

The seed furrow opener arm 22 can support one or a pair of seed discs 25, which can be rotatably connected to the seed furrow opener arm 22 via a shaft unit 24 and via bearings (not shown).

Each of the seed discs 25 has a respective geometric rotational axis. The rotational axes are non-parallel to each other, so that a mutual distance between the peripheries of the seed discs 25 is non-constant.

The rotational axes are defined by the shaft unit 24, which may comprise a central mounting portion 241 and a pair of shaft portions 242a, 242b.

The fastening portion 241 and the shaft portions 242a, 242b may be integrated with each other, such as by being formed of one and the same piece of material or by being welded. Alternatively, the shaft portions 242a, 242b may be threaded or press-fitted to the mounting portion 241.

The shaft portions 242a, 242b thus define the respective geometric axes of rotation of the seed discs 25. The axes of rotation form an obtuse angle with each other, which may be in the order of 165-179 degrees, preferably 167-172 degrees.

The seed discs 25 are mounted on the shaft portions 242a, 242b via bearings (not shown), for example roller bearings.

Figure 4A:
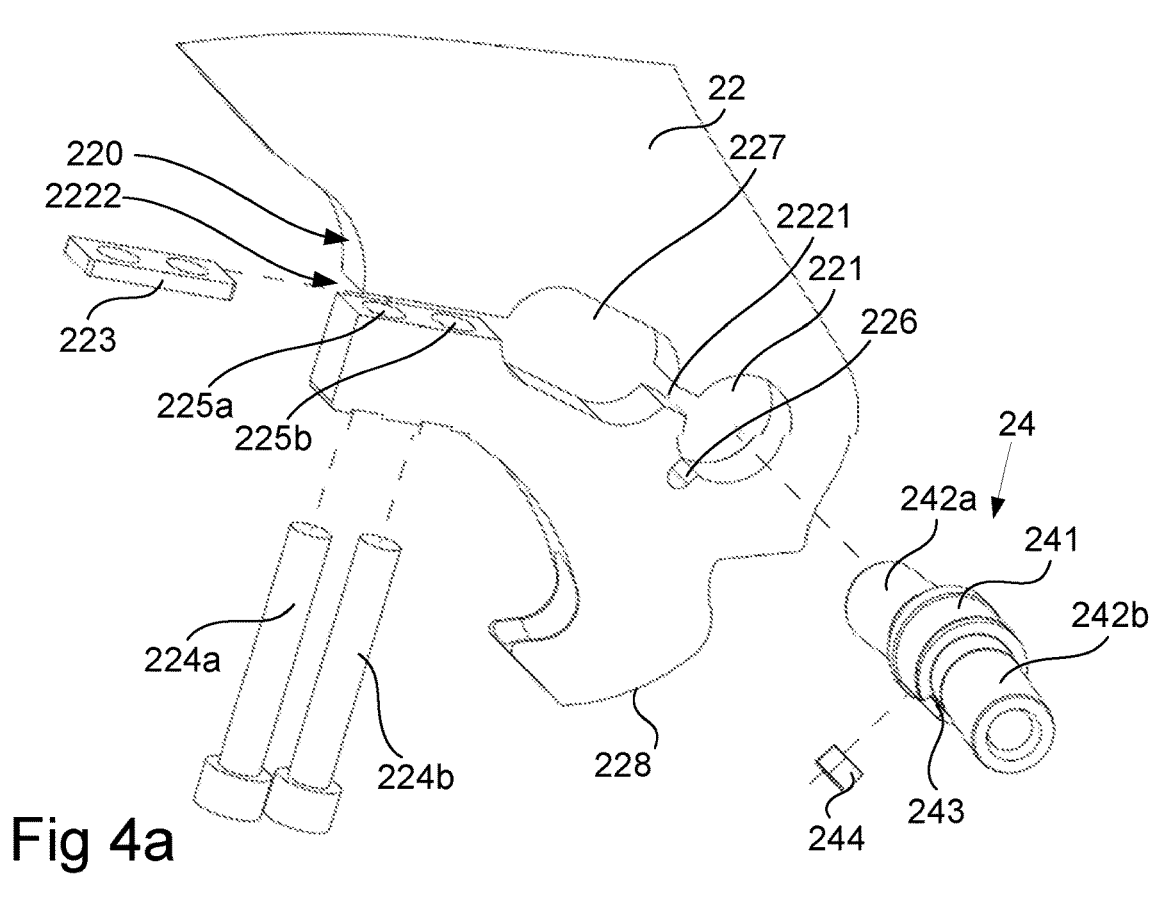
FIGS. 4a-4c show a part of the row unit frame.
Figure 4B:
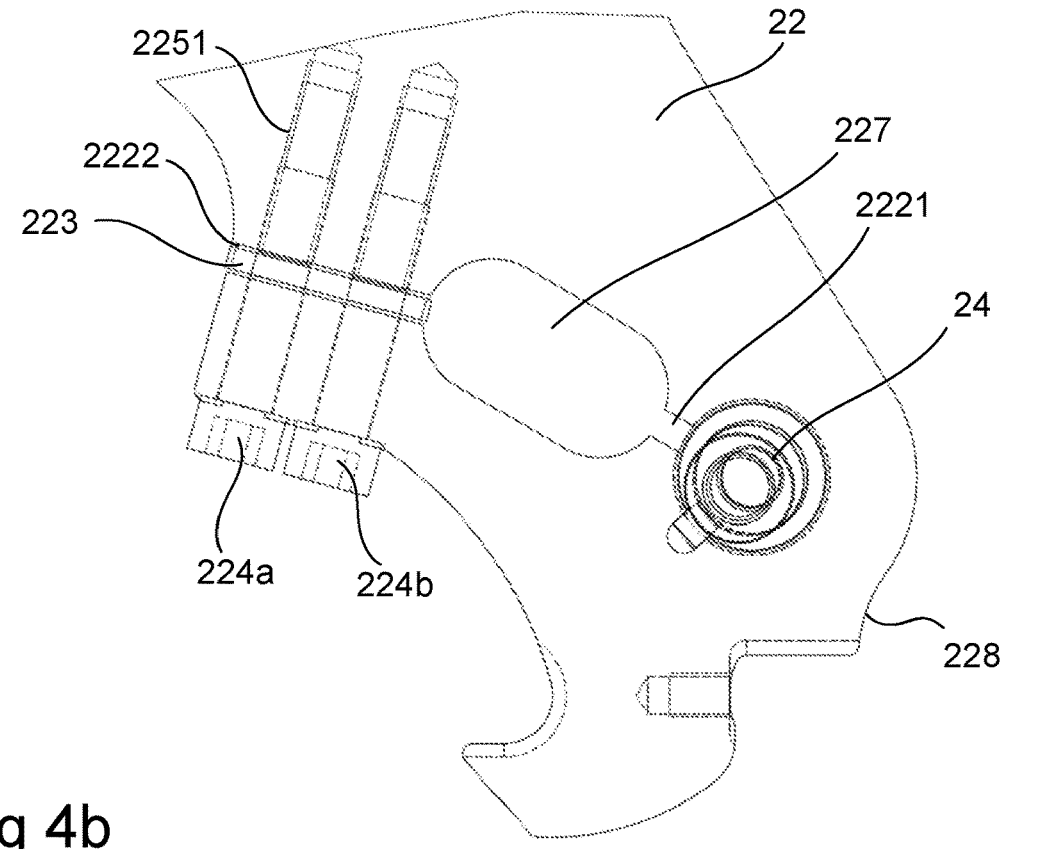
Figure 4C:
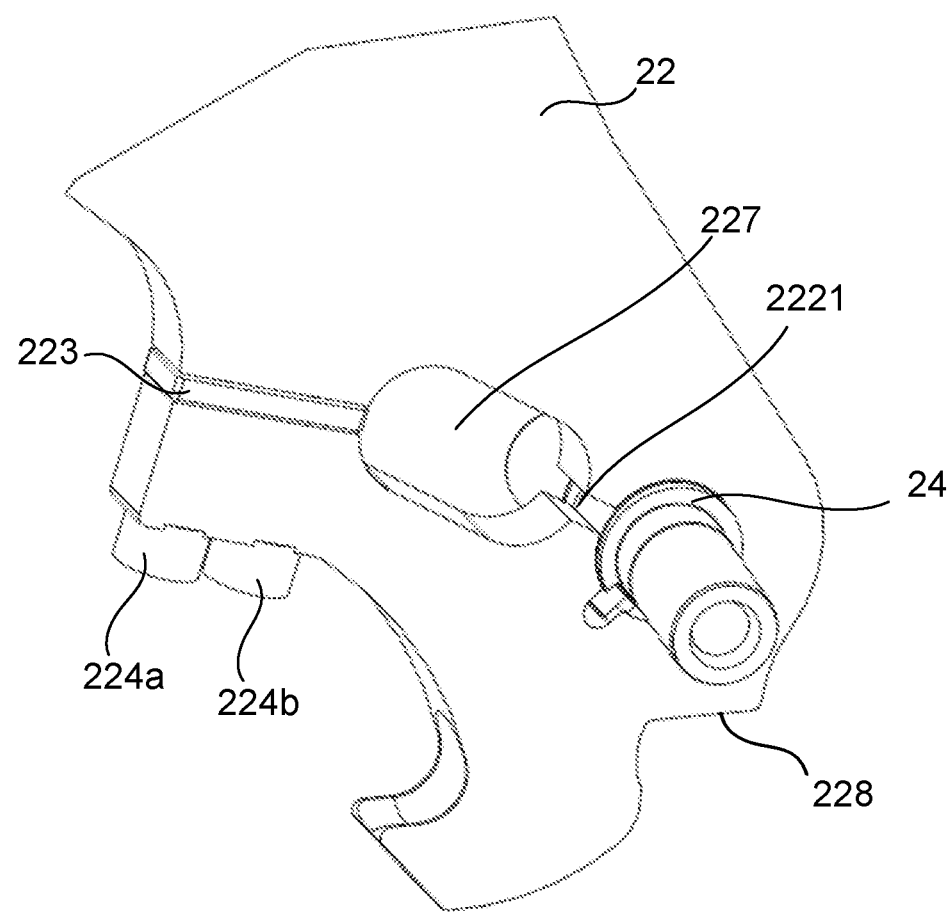

FIGS. 4a-4c schematically show the free end of the furnace opener 22.

FIG. 4a is a perspective view with an exploded view showing how the shaft unit 24 is mounted in a through-going cut-out 221 in the distal portion of the seed furrow opener arm. Further, FIG. 4a shows how a slot 2221, 2222 connects the cut-out 221 to a periphery 228 of the distal portion of the seed furrow opener arm 22, how a limiting washer 223 is provided in a portion 2222 of the slot and how a clamping device 224a, 224b; 225a, 225b are used to compress the slot 2221, 2222 so that the shaft assembly 24 is clamped in the cut-out 221.

Preferably, the cut-out 221 is spaced from a first peripheral portion 2201, the slot intersecting the periphery at a second peripheral portion 2202, a distance between the center of the cut-out 221 and the second peripheral portion 2202 being greater than a distance between the center of the cut-out 221 and the first peripheral portion 2201. For example, the distance between the center of the cut-out and the second peripheral portion 2202 may be 2-5 times, preferably 3-4 times, the distance between the center of the cut-out and the first peripheral portion 2201.

A part of the seed furrow opener arm 22 will thus be bent in its plane.

A washer 223 can be placed in the slot 2221, 2222 in order to ensure that the bend does not become too great, so that the yield strength of the material is not exceeded. Using a washer is advantageous compared to making the slot narrower, as it can be difficult to achieve a narrow slot with a sufficiently high tolerance. Mechanical cutting machining is preferable in this respect compared to, for example, laser cutting.

A second through cut-out 227 may be provided, for example, for the purpose of reducing the rigidity of the portion of the seed opening arm 22 which needs to be bent to provide the compression of the slot 2221, 2222.

For example, a first slot portion 2221 may connect the first cut-out 221 to the second cut-out 227. A second slot portion 2222 may connect the second cut-out 227 to the periphery 228.

To achieve compression, the holes 225a, 225b may be arranged so as to extend from an edge surface 220, across the slot 2222, in a direction parallel to the main surfaces and further on the other side of the slot, and have a threaded portion 2251 for engagement with respective bolts 224a, 224b.

The holes 225a, 225b may be completely spaced from the respective main surface.

Dimensions for the holes and bolts are selected based on power requirements and available material thickness of the seed opening arm 22. For thinner materials can more, but narrower, bolts be selected.

To ensure correct orientation of the seed discs, the shaft portion 24 may be provided with a shape-related guide relative to the seed furrow opener arm 22. This guide may be provided, for example, by means of keyways 243, 226 in the mounting portion 241 and in the cut-out 221, respectively.

Adjustment can be accomplished by rotating the seed furrow opener arm 22 relative to the frame 20.

Figure 5:
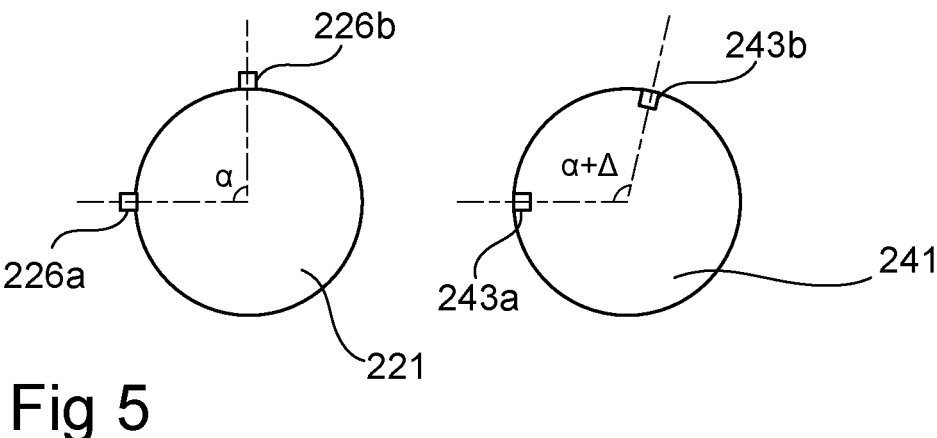
FIG. 5 schematically shows a cut-out and a shaft unit.

Referring to FIG. 5, with fixed socket opening arm 22, it is possible to provide adjustability between two fixed positions by, for example, providing two keyways 226a, 226b in the cut-out 221, which are divided by a center angle α of the cut-out. Similarly, two keyways 243a, 243b may be provided at the mounting portion 241, which may be divided by an angle α+Δ, where Δ may be in the range [−20 . . . 20] degrees, preferably [−10 . . . 10] degrees or [−5 . . . 5] degrees. The angle α can, as a non-limiting example, be 60-180 degrees. In the example shown, a is 90 degrees.

By aligning the wedge grooves 226a and 243a and placing a wedge 244 in engagement with both of these wedge grooves, a first relative rotational position between the groove opener arm 22 and the shaft assembly 24 can be achieved.

By instead aligning the wedge grooves 226b and 243b and placing a wedge 244 in engagement with both of these wedge grooves, a second relative rotational position between the seed furrow opener arm 22 and the shaft unit 24 can be achieved, which differs from the first by the angle A.

It is also possible to achieve adjustability by forming the fastening portion of two relatively movable parts, so that the shafts, together with a movable part of the fastening portion, can be rotated steplessly even though a fixed part of the fastening portion is fixed in the seed opening arm 22.

The movable part of the fastening portion can be provided with a lever, which can be adjusted and fixed at at least two fixed positions, alternatively continuously via a separate adjusting device.

Figures 6A, 6B:
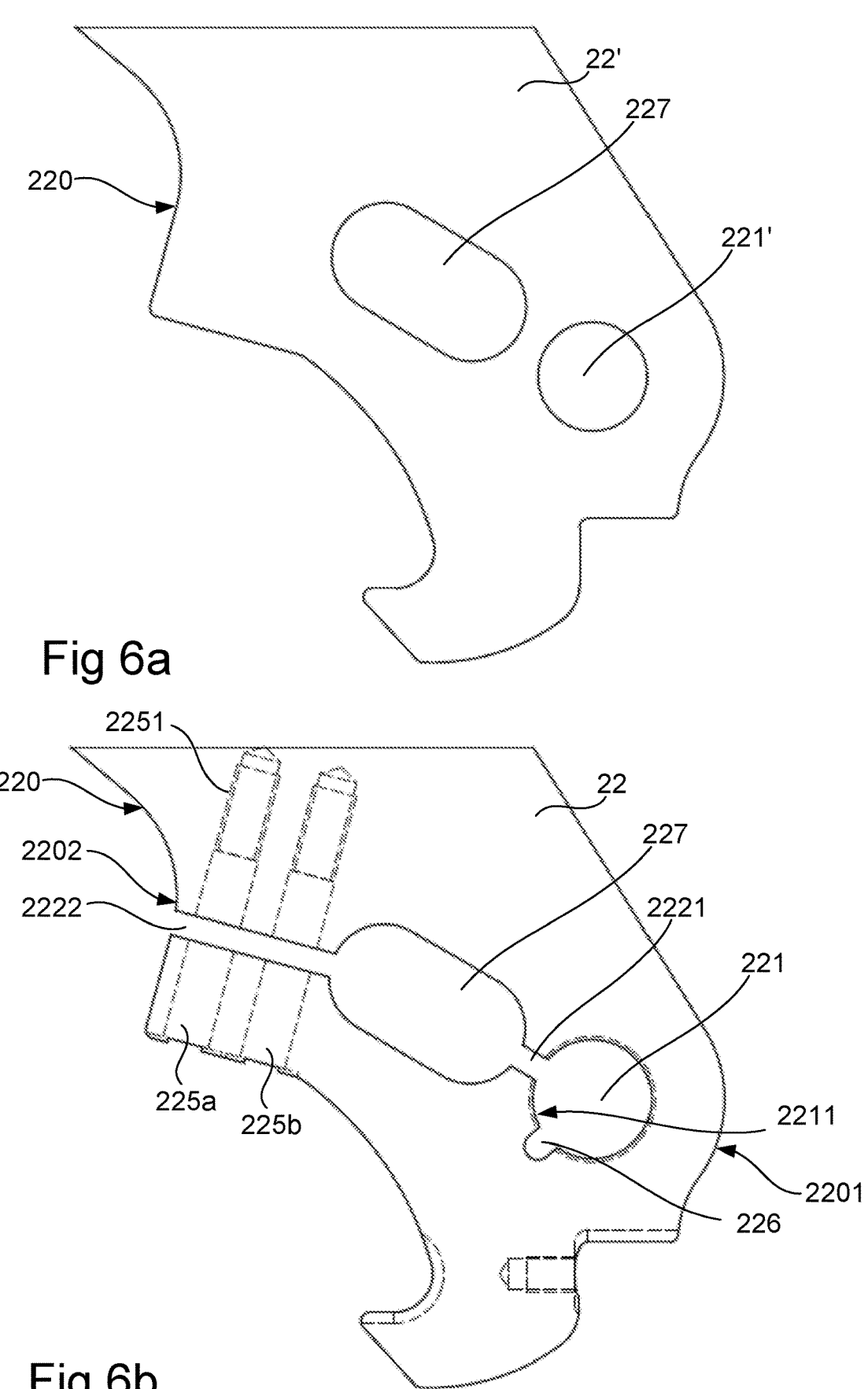
FIGS. 6a-6b illustrate the part of the row unit frame at two different stages of machining.

With reference to FIGS. 6a-6b, part of a method of manufacturing a seed opener will now be described.

FIG. 6a shows how a sheet blank is cut to form a seed furrow opener arm blank 22'. In this case a periphery 228 has been formed as well as a roughly worked first cut-out 221' and, optionally, a second cut-out 227.

The blank 22' can be formed by, for example, punching, laser cutting or other cutting technique.

As a next step, the cut-out 221 can be formed by cutting machining in the form of drilling, milling or grinding, so that an inwardly facing edge surface 2211 of the cut-out 221 with sufficient smoothness and dimensional accuracy is achieved.

Thereafter, the holes 225a, 225b can be formed.

Finally, the slot 2221, 2222 can be formed. For example, the first slot portion 2221 extending from the first cut-out 221 to the second cut-out 227 may be formed first, and then the second slot portion 2222 extending from the second cut-out 227 to the periphery 228 may be formed.

The slot 2221, 2222 is preferably formed by mechanical cutting machining, such as milling or sawing.

Surface treatment can take place before or after the slot is formed.

In this way it is ensured that the blank 22' retains its dimensions in the formation of the cut-out 221 and the slots 2221, 2222.

Any other manufacturing steps, for example in other parts of the distal portion of the seed opening arm 22, can advantageously be performed before the slot 2221, 2222 is formed.

A shaft unit 24 is selected based on which seed discs are to be used and the desired orientation of the seed discs.

The shaft unit 24 is arranged in the first cut-out 221. A force limiting washer 223 can be arranged in the slot portion 2222, after which bolts 224a, 224b are arranged in the holes 225a, 225b and tightened. The tightening can be limited by the washer. Alternatively, the torque wrench can be used to ensure that the bolts 224a, 224b are not tightened too tightly.

The shaft unit 24 can be easily detached from the seed opening arm 22, to be replaced or adjusted by loosening the bolts 224a, 224b.

To reorient the shaft portion, the wedge can be moved to another in wedge grooves in the same shaft portion, as described with reference to FIG. 5.

Alternatively, a different shaft portion, with a different location of the keyway, is selected to provide a different orientation of the seed discs 25.

The invention claimed is:

1. A seed furrow opener, comprising:
a seed furrow opener arm, and
a pair of seed discs rotatably connected to the seed furrow opener arm via at least one shaft unit,
each of the seed discs having a respective geometric rotational axis, and
the rotational axes being non-parallel to each other, so that a mutual distance between the peripheries of the seed discs is non-constant,
further comprising:
a continuous cut-out formed in the seed furrow opener arm, for mounting the shaft unit,
a slot extending from the cut-out to a periphery of the seed furrow opener arm, and
a clamping device arranged to compress the slot, so that the shaft unit is clamped in the cut-out,
wherein the continuous cut-out and the slot extending from the cut-out is formed in a flat blank of substantially constant thickness, and wherein the blank has a pair of opposite and mutually parallel main surfaces and an edge surface extending therebetween.

2. Seed furrow opener according to claim 1, wherein the clamping device comprises at least one bolt acting in direction parallel to said major surfaces of the planar blank.

3. Seed furrow opener of claim 2, wherein the bolt is received in a cut-out in the edge surface, wherein said cut-out is spaced from the main surfaces.

4. Seed furrow opener according to claim 1, further comprising a limiting member, for limiting a clamping force provided by the clamping device.

5. Seed furrow opener of claim 4, wherein the limiting member is arranged at least partially in the slot.

6. A seed furrow opener according to claim 1, wherein the shaft unit comprises a fastening portion and a pair of shaft portions, which extend from respective opposite sides of the fastening portion and non-parallel to each other.

7. Seed furrow opener according to claim 1, wherein at least one of the cut-out and the shaft unit comprises a locking device for counteracting relative rotational movement between the cut-out and the shaft unit.

8. Seed furrow opener according to claim 7, wherein the locking device comprises at least one keyway formed in the cut-out and in the shaft unit.

9. Seed furrow opener of claim 7, wherein the locking device is configured to lock the shaft unit relative to the cut-out in at least two different relative rotational positions.

10. Seed furrow opener according to claim 9, wherein the locking device comprises at least two keyways formed in the cut-out and in the shaft unit, which are separated by a center angle of at least 20 degrees, and which are arranged so that the at least two mutual rotational positions differ by less than 20 degrees.

11. Row unit comprising a seed furrow opener according to claim 1.

12. The row unit according to claim 11, wherein the row unit comprises a row unit frame and wherein the seed furrow opener arm is movably connected to the row unit frame.

13. The row unit according to claim 11, wherein the row unit comprises a row unit frame and wherein the seed opener arm is integrated with the row unit frame.

14. An Agricultural implement comprising at least two row units according to claim 11.

15. Agricultural implement according to claim 14, wherein the agricultural implement comprises an implement frame and wherein each of the row units is movably connected to the implement frame.

16. A method of mounting a seed furrow opener, comprising:
providing a furrow opener arm, comprising:
a through-going cut-out formed in the seed furrow opener arm, for mounting a shaft unit,
a slot extending from the cut-out to a periphery of the groove opener arm, and
a clamping device arranged to compress the slot, so that the shaft unit is clamped in the cut-out;
wherein the through-going cut-out and the slot extending from the cut-out is formed in a flat blank of substantially constant thickness, and wherein the blank has a pair of opposite and mutually parallel main surfaces and an edge surface extending therebetween;
providing the shaft unit, comprising a mounting portion and a pair of shaft portions extending from respective opposite sides of the mounting portion and non-parallel to each other,
arranging the mounting portion of the shaft unit in the cut-out, and
actuating the clamping device so that the slot is compressed and the shaft unit is clamped in the cut-out.

17. The method of claim 16, further comprising providing a limiting member, and arranging it in the slot to limit the compression of the slot.

18. A seed furrow opener comprising:
a seed furrow opener arm;
the seed opener arm including an end portion in the form of a flat blank having a generally constant thickness and including opposed sides and an outer edge that extends between the opposed sides;
a cut-out formed in the blank and extending completely through the blank such that the cut-out is open on both sides of the blank;
a slot communicatively open to said cut-out and extending from the cut-out through the blank and through the edge of the blank;
the slot being open to both sides of the blank and dividing a portion of the blank into first and second portions that lie adjacent the slot;
a shaft unit disposed in the cut-out and including a fastening portion disposed in the cut-out between the sides of the blank, and a pair of shaft portions that project outwardly from the cut-out on both sides of the blank;
at least one seed disc mounted on the pair of shaft portions; and
a clamp structure engaging the first and second portions that lie on opposite sides of the slot and which draw the first and second portions towards each other, narrowing the slot and causing the cut-out to close around the fastening portion of the shaft and clamp the shaft in the cut-out.

* * * * *